(12) United States Patent
Hikosaka

(10) Patent No.: US 10,567,712 B2
(45) Date of Patent: Feb. 18, 2020

(54) IMAGING DEVICE AND IMAGING SYSTEM

(71) Applicant: CANON KABUSHIKI KAISHA, Tokyo (JP)

(72) Inventor: Shingo Hikosaka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/180,675

(22) Filed: Nov. 5, 2018

(65) Prior Publication Data
US 2019/0149780 A1    May 16, 2019

(30) Foreign Application Priority Data
Nov. 13, 2017 (JP) ................. 2017-218283

(51) Int. Cl.
*H04N 9/04* (2006.01)
*H04N 9/64* (2006.01)
(Continued)

(52) U.S. Cl.
CPC ....... *H04N 9/04515* (2018.08); *G06T 3/4015* (2013.01); *H04N 9/04555* (2018.08); *H04N 9/646* (2013.01); *B60W 30/09* (2013.01); *B60W 30/0956* (2013.01); *B60W 2420/42* (2013.01); *B60W 2550/10* (2013.01);
(Continued)

(58) Field of Classification Search
CPC ........... H04N 9/04515; H04N 9/04516; H04N 9/04555; H04N 5/349; H04N 5/378; F04N 9/646; G06T 3/4015; G06T 5/001; G06T 5/003

USPC .... 348/222.1, 234, 236, 270, 271, 272, 273, 348/276, 277, 281; 382/162, 165, 168, 382/167, 278; 257/257, 258, 291, 292; 250/208.1
See application file for complete search history.

(56) References Cited

U.S. PATENT DOCUMENTS 6,697,110 B1    2/2004   Jaspers
9,288,457 B2    3/2016   Saito
(Continued)

FOREIGN PATENT DOCUMENTS

JP    2001-501070    1/2001
JP    2009-33737     2/2009
(Continued)

OTHER PUBLICATIONS

U.S. Appl. No. 16/205,862, filed Nov. 30, 2018, by Fujio Kawano.

*Primary Examiner* — Marly S Camargo
(74) *Attorney, Agent, or Firm* — Venable LLP

(57) ABSTRACT

A disclosed imaging device includes an imaging element that includes a plurality of pixels including a plurality of first pixels each of which outputs a signal including color information and a plurality of second pixels each of which has higher sensitivity than the first pixels, and a signal processing unit that processes a signal output from the imaging element. The signal processing unit includes a luminance signal processing unit that generates luminance values of the first pixels based on signals output from the second pixels and a false color determination unit that determines a presence or absence of false color based on a result of comparison between the luminance values of the first pixels generated by the luminance signal processing unit and a predetermined threshold value.

19 Claims, 15 Drawing Sheets

(51) Int. Cl.
*G06T 3/40* (2006.01)
*G06T 5/00* (2006.01)
*H04N 5/349* (2011.01)
*H04N 5/378* (2011.01)
*B60W 30/095* (2012.01)
*B60W 30/09* (2012.01)

(52) U.S. Cl.
CPC ... *B60W 2550/308* (2013.01); *B60W 2710/18* (2013.01); *B60W 2710/30* (2013.01); *B60W 2720/10* (2013.01)

(56) References Cited

U.S. PATENT DOCUMENTS

| | | | | |
|---|---|---|---|---|
| 2007/0035641 A1* | 2/2007 | Yamada | .................. | H04N 9/045 348/223.1 |
| 2009/0015693 A1 | 1/2009 | Wada | | |
| 2010/0141812 A1* | 6/2010 | Hirota | .................. | H04N 5/335 348/279 |
| 2011/0050918 A1* | 3/2011 | Tachi | .................. | H04N 5/228 348/208.4 |
| 2012/0154637 A1 | 6/2012 | Hara | | |
| 2013/0216130 A1* | 8/2013 | Saito | .................. | G06T 5/007 382/165 |
| 2013/0272605 A1 | 10/2013 | Saito | | |
| 2015/0156468 A1* | 6/2015 | Moriguchi | .................. | H04N 9/045 348/222.1 |
| 2016/0337623 A1* | 11/2016 | Onishi | .................. | H04N 9/045 348/277 |
| 2016/0344956 A1* | 11/2016 | Takado | .................. | H04N 5/3597 348/280 |
| 2017/0257605 A1* | 9/2017 | Iwakura | .................. | H04N 5/378 348/278 |

FOREIGN PATENT DOCUMENTS

| | | |
|---|---|---|
| JP | 2012-134581 | 7/2012 |
| JP | 2013-219705 | 10/2013 |
| WO | 99/04555 | 1/1999 |
| WO | 2013/161349 | 10/2013 |

\* cited by examiner

FIG. 4A

RGBW12

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 4B

RGBW8

| R | W | B | W | R | W | B | W |
|---|---|---|---|---|---|---|---|
| W | G | W | G | W | G | W | G |
| B | W | R | W | B | W | R | W |
| W | G | W | G | W | G | W | G |
| R | W | B | W | R | W | B | W |
| W | G | W | G | W | G | W | G |
| B | W | R | W | B | W | R | W |
| W | G | W | G | W | G | W | G |

|   | 1 | 2 | 3 | 4 | 5 | 6 | 7 | 8 |
|---|---|---|---|---|---|---|---|---|
| 1 | R | W | G | W | R | W | G | W |
| 2 | W | W | W | W | W | W | W | W |
| 3 | G | W | B | W | G | W | B | W |
| 4 | W | W | W | W | W | W | W | W |
| 5 | R | W | G | W | R | W | G | W |
| 6 | W | W | W | W | W | W | W | W |
| 7 | G | W | B | W | G | W | B | W |
| 8 | W | W | W | W | W | W | W | W |

|   | 1 | 2 | 3 | 4 | 5 | 6 | 7 | 8 |
|---|---|---|---|---|---|---|---|---|
| 1 | iWr | W | iWg | W | iWr | W | iWg | W |
| 2 | W | W | W | W | W | W | W | W |
| 3 | iWg | W | iWb | W | iWg | W | iWb | W |
| 4 | W | W | W | W | W | W | W | W |
| 5 | iWr | W | iWg | W | iWr | W | iWg | W |
| 6 | W | W | W | W | W | W | W | W |
| 7 | iWg | W | iWb | W | iWg | W | iWb | W |
| 8 | W | W | W | W | W | W | W | W |

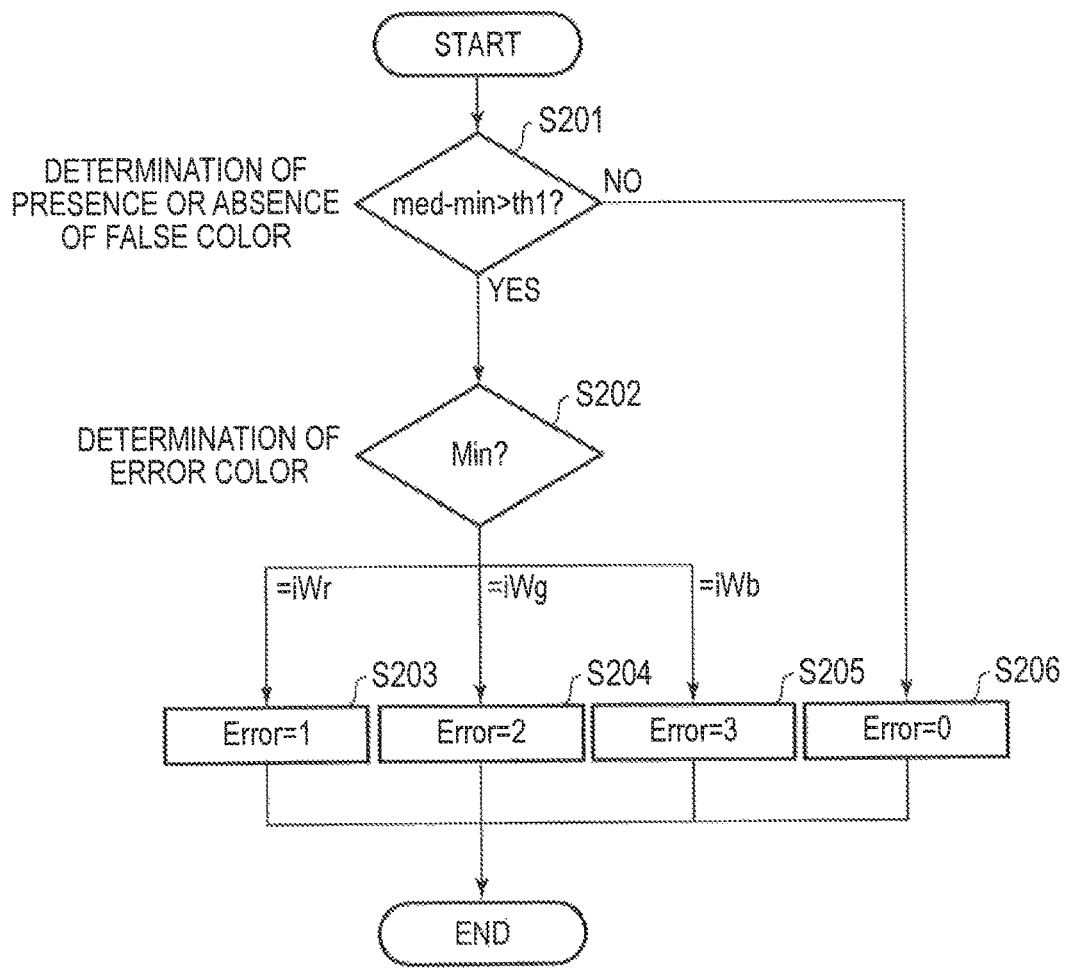

FIG. 12

|   | 1 | 2 | 3 | 4 | 5 | 6 | 7 | 8 |
|---|---|---|---|---|---|---|---|---|
| 1 | R | W | G | W | R | W | G | W |
| 2 | W | W | W | W | W | W | W | W |
| 3 | G | W | B | W | G | W | B | W |
| 4 | W | W | W | W | W | W | W | W |
| 5 | R | W | G | W | R | W | G | W |
| 6 | W | W | W | W | W | W | W | W |
| 7 | G | W | B | W | G | W | B | W |
| 8 | W | W | W | W | W | W | W | W |

IMAGING DEVICE AND IMAGING SYSTEM

BACKGROUND OF THE INVENTION

Field of the Invention

The present invention relates to an imaging device and an imaging system.

Description of the Related Art

In a single-plate-type imaging device, color filters (CF) through which specific wavelength components, for example, lights of respective colors of red (R), green (G), and blue (B) pass are arranged in a particular pattern on pixels in order to obtain a color image. As a CF pattern, those having a so-called Bayer arrangement are widely used. Further, in addition to a CF of RGB, there is a growing use of a CF of an RGBW arrangement that includes W pixels having a filter that transmits light in the entire wavelength range of visible light. While a CF of the RGBW arrangement can improve the detection sensitivity by using the W pixel, the density of RGB pixels is lower than other CF arrangements such as a Bayer arrangement, and thus there is a problem of false color being likely to occur.

International Publication No. WO2013/161349 discloses an image processing device and an image processing method for reducing the influence of false color that occurs when a high-luminance light locally enters an imaging device having a CF of the RGBW arrangement.

Generally, a demosaicing process of pixels of the RGBW arrangement is performed based on the ratio of pixel values of RGB pixels and W pixels. The ratio of the pixel values of the RGB pixels and the W pixels here is ideally constant regardless of the luminance. In practice, however, a lower luminance of an incident light results in a larger error from the ideal value due to an offset component of pixels, random noise, or the like, and such an error causes the false color.

SUMMARY OF THE INVENTION

An object of the present invention is to provide an imaging device and an imaging system that can accurately determine false color due to an offset component of pixels, random noise, or the like.

According to one aspect of the present invention, there is provided an imaging device including an imaging element that includes a plurality of pixels including a plurality of first pixels each of which outputs a signal including color information and a plurality of second pixels each of which has higher sensitivity than the first pixels, and a signal processing unit that processes a signal output from the imaging element, wherein the signal processing unit includes a luminance signal processing unit that generates luminance values of the first pixels based on signals output from the second pixels and a false color determination unit that determines a presence or absence of false color based on a result of comparison between the luminance values of the first pixels generated by the luminance signal processing unit and a predetermined threshold value.

According to another aspect of the present invention, there is provided a signal processing device that processes a signal output from an imaging element that includes a plurality of pixels including a plurality of first pixels each of which outputs a signal including color information and a plurality of second pixels each of which has higher sensitivity than the first pixels, the signal processing device including a luminance signal processing unit that generates luminance values of the first pixels based on luminance information output from the second pixels, and a false color determination unit that determines false color by comparing the luminance values of the first pixels generated by the luminance signal processing unit to a predetermined threshold value.

According to yet another aspect of the present invention, there is provided an imaging system including an imaging device including an imaging element that includes a plurality of pixels including a plurality of first pixels each of which outputs a signal including color information and a plurality of second pixels each of which has higher sensitivity than the first pixels, and a signal processing unit that processes a signal output from the imaging device, wherein the signal processing unit includes a luminance signal processing unit that generates luminance values of the first pixels based on luminance information output from the second pixels, and a false color determination unit that determines false color by comparing the luminance values of the first pixels generated by the luminance signal processing unit to a predetermined threshold value.

Further features of the present invention will become apparent from the following description of exemplary embodiments with reference to the attached drawings.

BRIEF DESCRIPTION OF THE DRAWINGS

FIG. 4A and FIG. 4B are diagrams illustrating an example of a color filter arrangement in the imaging element of the imaging device according to the first embodiment of the present invention.

FIG. 8 is a flowchart illustrating a false color determination method in the imaging device according to the first embodiment of the present invention.

FIG. 9 is a diagram illustrating a picture image within a certain color calculation region when a vertical stripe pattern is captured.

FIG. 12 is a diagram illustrating a picture image within a certain color calculation region when a lattice pattern is captured.

DESCRIPTION OF THE EMBODIMENTS

Preferred embodiments of the present invention will now be described in detail in accordance with the accompanying drawings.

[First Embodiment]
An imaging device and a signal processing method according to a first embodiment of the present invention will be described with reference to FIG. 1 to FIG. 10.

Figure 1:
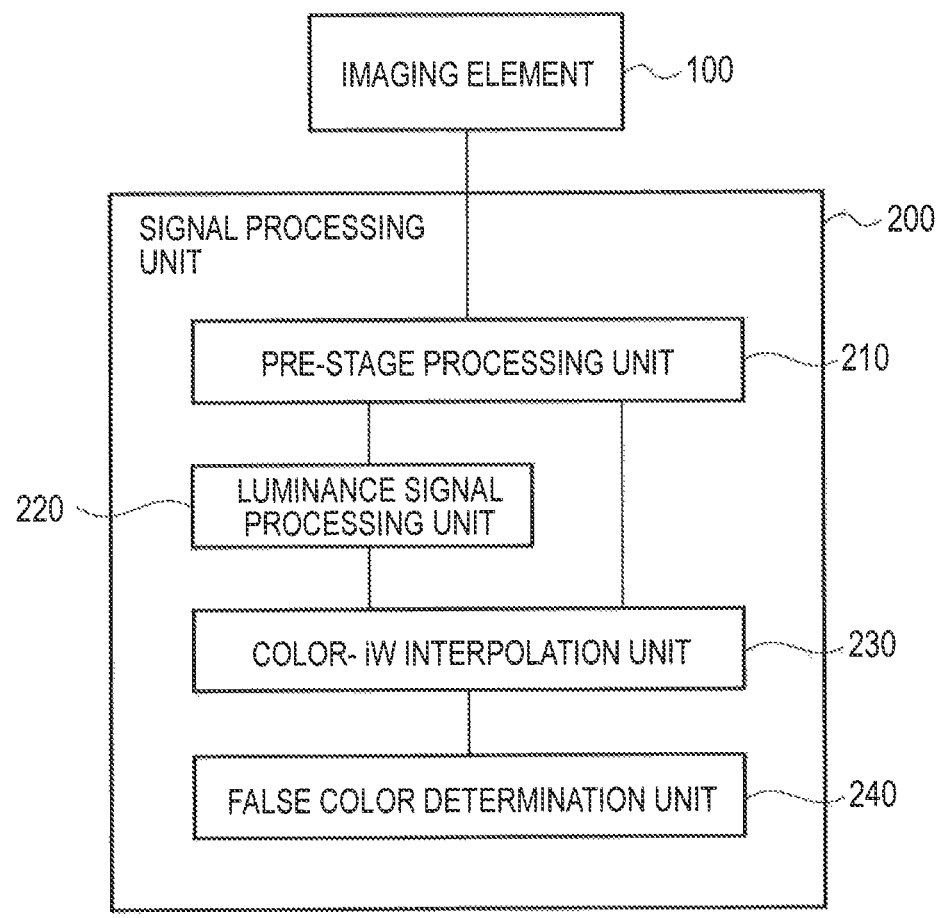
FIG. 1 is a block diagram illustrating a configuration example of an imaging device according to a first embodiment of the present invention.
Figure 2:
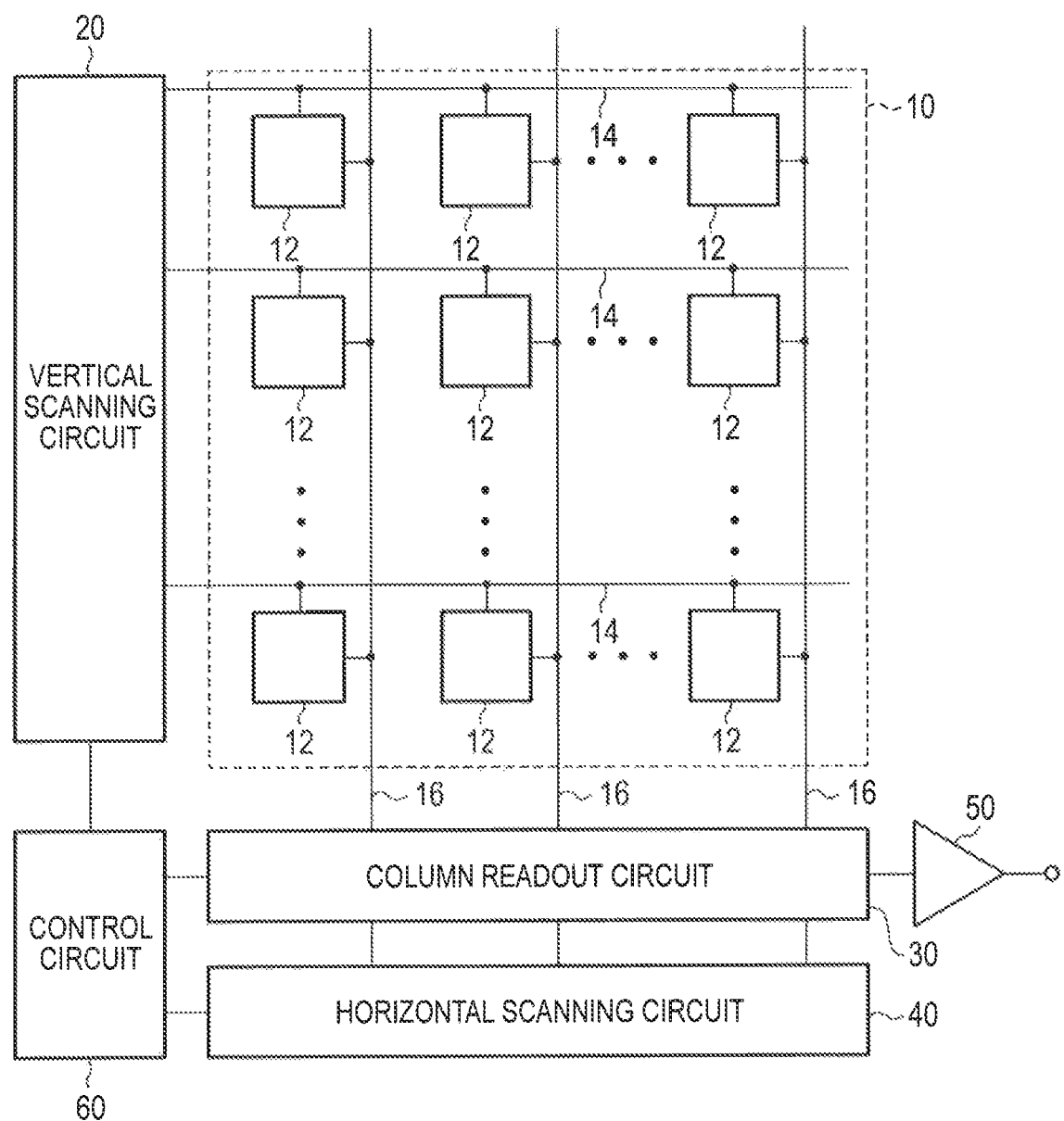
FIG. 2 is a block diagram illustrating a configuration example of an imaging element of the imaging device according to the first embodiment of the present invention.
Figure 3:
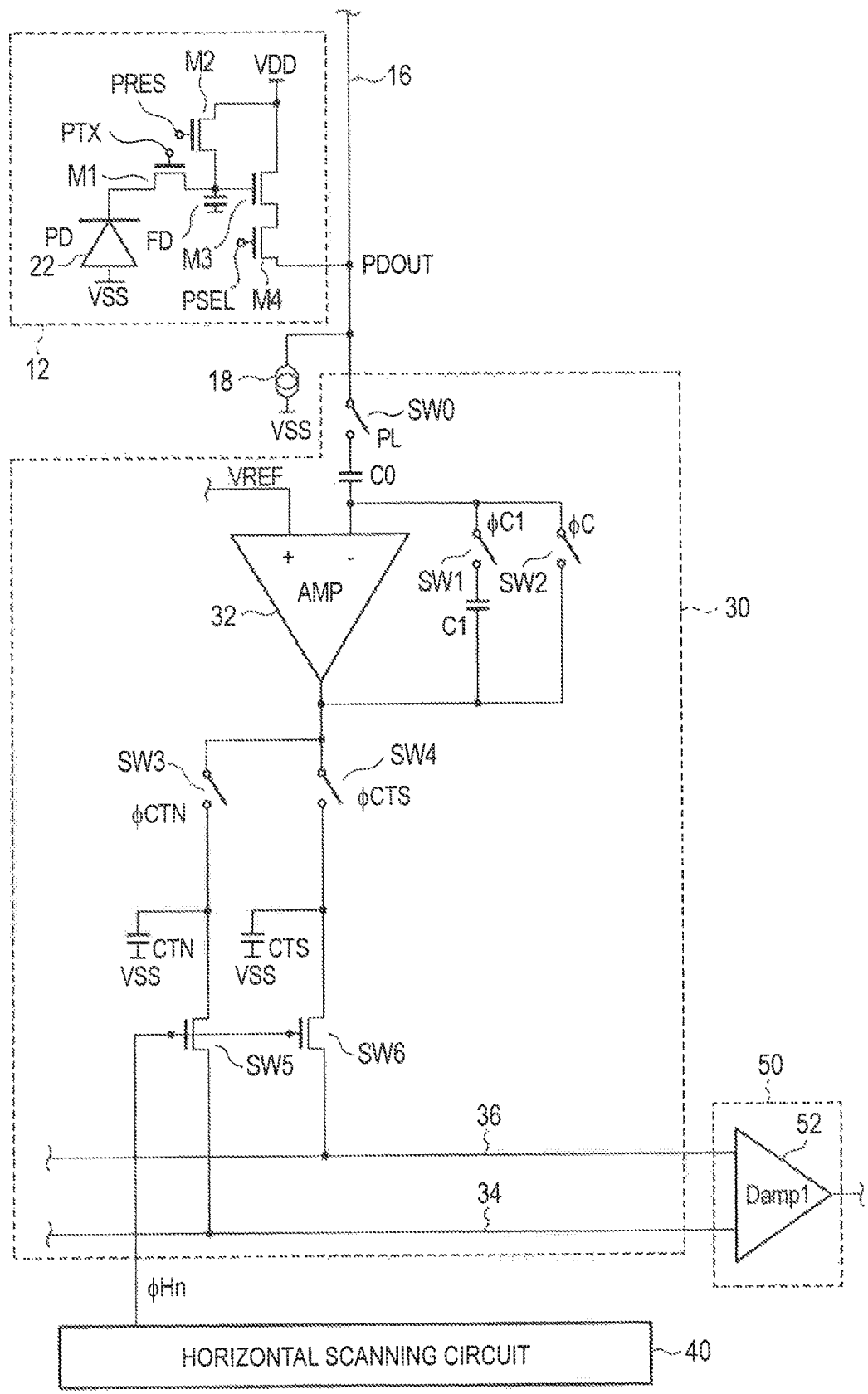
FIG. 3 is a circuit diagram illustrating a configuration example of a pixel and a column readout circuit of the imaging element of the imaging device according to the first embodiment of the present invention.

First, a general configuration of the imaging device according to the present embodiment will be described by using FIG. 1 to FIG. 4B. FIG. 1 is a block diagram illustrating a configuration example of the imaging device according to the present embodiment. FIG. 2 is a block diagram illustrating a configuration example of an imaging element of the imaging device according to the present embodiment. FIG. 3 is a circuit diagram illustrating a configuration example of a pixel and a column readout circuit of the imaging element of the imaging device according to the present embodiment. FIG. 4A and FIG. 4B are diagrams illustrating an example of a color filter arrangement in the imaging element of the imaging device according to the present embodiment.

The imaging device according to the present embodiment includes an imaging element 100 and a signal processing unit 200, as illustrated in FIG. 1.

The imaging element 100 converts a light signal (object image) received through an optical system (not illustrated) into an electric signal and outputs the converted signal. The imaging element 100 may be formed of a so-called single-plate-type color sensor in which a color filter (hereinafter, also referred to as "CF") is arranged over a CMOS image sensor or a CCD image sensor, for example.

The signal processing unit 200 performs a predetermined signal processing on a signal output from the imaging element 100. The signal processing unit 200 includes a pre-stage processing unit 210, a luminance signal processing unit 220, a color-iW interpolation unit 230, and a false color determination unit 240. A pixel signal from the imaging element 100 is input to the pre-stage processing unit 210. The pre-stage processing unit 210 performs a predetermined correction on the pixel signal and divides the corrected pixel signal into a pixel signal for resolution information (luminance signal) and a pixel signal for color information (color signal). The luminance signal divided from the pixel signal in the pre-stage processing unit 210 is input to the luminance signal processing unit 220, and the color signal divided from the pixel signal in the pre-stage processing unit 210 is input to the color-iW interpolation unit 230. The luminance signal processing unit 220 performs an interpolation process on the luminance signal. The luminance signal processed in the luminance signal processing unit 220 is input to the color-iW interpolation unit 230. The color-iW interpolation unit 230 performs an interpolation process based on the luminance signal and the color signal obtained after the interpolation process and calculates color information of each pixel. The false color determination unit 240 determines false color based on color information output from the color-iW interpolation unit 230 and outputs the presence or absence of false color and color information causing the false color.

The imaging element 100 and the signal processing unit 200 may be provided on the same chip or may be provided on different chips or devices. When it is configured to be provided on a single chip, the imaging element 100 and the signal processing unit 200 may be both provided on a single semiconductor substrate or may be separately provided on different semiconductor substrates and then stacked. Further, the imaging element 100 and the signal processing unit 200 are not necessarily configured as a single unit, but the signal processing unit 200 may be configured as a signal processing device or an image processing device that processes a signal output from the imaging element 100 or the imaging device.

The imaging element 100 includes an imaging region 10, a vertical scanning circuit 20, a column readout circuit 30, a horizontal scanning circuit 40, an output circuit 50, and a control circuit 60, as illustrated in FIG. 2.

In the imaging region 10, a plurality of pixels 12 are provided in a matrix over a plurality of rows and a plurality of columns. For example, a total of 2073600 pixels including 1920 pixels in the column direction and 1080 pixels in the row direction are arranged in the imaging region 10. The number of pixels arranged in the imaging region 10 is not particularly limited, and a larger number of pixels or a smaller number of pixels may be applicable.

On each row of the imaging region 10, a control line 14 is arranged extending in a first direction (horizontal direction in FIG. 2). The control line 14 is connected to the pixels 12 aligned in the first direction, respectively, to form a signal line common to these pixels 12. The first direction in which the control line 14 extends may be referred to as a row direction in the present specification. Further, on each column of the imaging region 10, an output line 16 is arranged extending in a second direction intersecting with the first direction (vertical direction in FIG. 2). The output line 16 is connected to the pixels 12 aligned in the second direction, respectively, to form a signal line common to these pixels 12. The second direction in which the output line 16 extends may be referred to as a column direction in the present specification.

The control line 14 on each row is connected to the vertical scanning circuit 20. The vertical scanning circuit 20 supplies control signals used for controlling transistors of the pixel 12 to be turned on (conductive state) or off (nonconductive state). The output line on each column is connected to the column readout circuit 30. The column readout circuit 30 performs a predetermined process such as an amplification process, for example, on the pixel signal read out via the output line 16 and holds the processed signal. The horizontal scanning circuit 40 supplies a control signal used for controlling a switch connected to a signal holding unit of each column of the column readout circuit 30. The output circuit 50 is formed of a buffer amplifier or a differential amplifier circuit and outputs a pixel signal read out from the signal holding unit of the column readout circuit 30 in response to the control signal from the horizontal scanning circuit 40 to the signal processing unit 200. The control circuit 60 is a circuit unit that supplies, to the vertical scanning circuit 20, the column readout circuit 30, and the horizontal scanning circuit 40, control signals for controlling the operations or the timings thereof. Some or all of the control signals to be supplied to the vertical scanning circuit 20, the column reading circuit 30, and the horizontal scanning circuit 40 may be supplied from the outside of the imaging element 100.

Each of the pixels 12 includes a photoelectric converter PD, a transfer transistor M1, a reset transistor M2, an amplifier transistor M3, and a select transistor M4, as illustrated in FIG. 3. The photoelectric converter PD is a photodiode, for example. The photodiode forming the photoelectric converter PD has the anode connected to a reference voltage node (voltage VSS) and the cathode connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion FD. The floating diffusion FD includes a capacitance component, functions as a charge holding portion, and forms a charge-to-voltage conversion unit having that capacitance component. The drain of the reset transistor M2 and the drain of the amplifier transistor M3 are connected to a power supply node (voltage VDD). The source of the amplifier transistor M3 is connected to the drain of the select transistor M4. The source of the select transistor M4 that also serves as an output node PDOUT of the pixel 12 is connected to the output line 16. A current source 18 is connected to the output line 16.

In the case of the pixel 12 of the circuit configuration illustrated in FIG. 3, the control line 14 on each row includes a signal line connected to the gate of the transfer transistor M1, a signal line connected to the gate of the reset transistor M2, and a signal line connected to the gate of the select transistor M4. A control signal PTX is supplied to the transfer transistor M1 from the vertical scanning circuit 20 via the control line 14. A control signal PRES is supplied to the reset transistor M2 from the vertical scanning circuit 20 via the control line 14. A control signal PSEL is supplied to the select transistor M4 from the vertical scanning circuit 20 via the control line 14. The plurality of pixels 12 in the imaging region 10 are controlled by the control signals PTX, PRES, and PSEL supplied from the vertical scanning circuit 20 on a column-by-column basis.

The column readout circuit 30 includes a column amplifier 32, capacitors C0, C1, CTN, and CTS, and switches SW0, SW1, SW2, SW3, SW4, SW5, and SW6 on each column of the imaging region 10, as illustrated in FIG. 3.

The column amplifier 32 is formed of the differential amplifier circuit that includes an inverting input node, a non-inverting input node, and an output node. The inverting input node of the column amplifier 32 is connected to the output line 16 via the capacitor C0 and the switch SW0 driven by a signal PL. A reference voltage VREF is supplied to the non-inverting input node of the column amplifier 32. A first feedback path formed of the switch SW1 driven by a signal ϕC1 and the capacitor C1, which are connected in series, and a second feedback path formed of the switch SW2 driven by a signal ϕC are provided between the inverting input node and the output node of the column amplifier 32.

To the output node of the column amplifier 32, the capacitor CTN and one primary node of the switch SW5 are connected via the switch SW3, and the capacitor CTS and one primary node of the switch SW6 are connected via the switch SW4, respectively. The switches SW3 and SW4 are driven by signals ϕCTN and ϕCTS, respectively.

The other primary node of the switch SW5 is connected to a horizontal output line 34. Further, the other primary node of the switch SW6 is connected to a horizontal output line 36. The horizontal scanning circuit 40 outputs signals ϕHn subsequently to control nodes of the switches SW5 and SW6 of the column readout circuit 30 on each column. The output circuit 50 includes an output amplifier 52. The horizontal output lines 34 and 36 are connected to the output amplifier 52.

On each pixel 12 arranged in the imaging region 10, a color filter having predetermined spectral sensitivity characteristics is arranged in accordance with a color filter arrangement (hereinafter, referred to as "CF arrangement") illustrated in FIG. 4A. Each rectangular region in FIG. 4A corresponds to one pixel 12. That is, FIG. 4A illustrates a CF arrangement corresponding to a pixel array of eight rows by eight columns. The color filters used in the present embodiment includes a red filter R, a green filter G, a blue filter B, and a white filter W. In the following description, the pixel 12 on which the red filter R is provided is referred to as "R pixel", the pixel 12 on which the green filter G is provided is referred to as "G pixel", and the pixel 12 on which the blue filter B is provided is referred to as "B pixel". The R pixel, the G pixel, and the B pixel are pixels mainly used for outputting color information and may be referred to as "color pixels" or "RGB pixels". Further, the pixel 12 on which the white filter W is provided is referred to as "W pixel". The W pixel is a pixel mainly used for outputting luminance information and may be referred to as "white pixel".

The W pixel is a pixel that directly detects an incident light without color separation. The W pixel is characterized by a wide transmission wavelength range and high sensitivity in the spectral sensitivity characteristics compared to the R pixel, the G pixel, and the B pixel and has the widest wavelength full width at half maximum of the transmission wavelength in the spectral sensitivity characteristics. Typically, the transmission wavelength range in the spectral sensitivity characteristics of the W pixel covers the transmission wavelength range in the spectral sensitivity characteristics of the R pixel, the G pixel, and the B pixel.

In the CF arrangement illustrated in FIG. 4A, a block of contiguous four rows by four columns is the smallest repetition unit. In the 16 pixels 12 included in such a unit block, the ratio of the R pixel, the G pixel, the B pixel, and the W pixel is R:G:B:W=1:2:1:12. This CF arrangement having the 12 W pixels in a unit block of four rows by four columns is referred to as "RGBW12 arrangement" in the present specification. The ratio of the RGB pixels to the W pixels, RGB:W is 1:3 in the RGBW12 arrangement. The RGBW12 arrangement is featured in that every color pixel of the R pixel, the G pixel, and the B pixel is surrounded by the W pixels, and the ratio of the W pixels of all the pixels is 3/4.

In other words, the RGBW12 arrangement includes color pixels as first pixels and white pixels as second pixels, and the total number of the second pixels is three times (twice or more) the total number of the first pixels. The first pixels include multiple types of pixels (the R pixel, the G pixel, and the B pixel) for outputting color information on different colors. Note that, while the imaging element 100 may include not only effective pixels but also a pixel that does not output a signal used for forming an image, such as an optical black pixel, a dummy pixel, a null pixel, or the like, which is not included in the first pixel and the second pixel described above.

When using the RGBW12 arrangement, since the RGB pixels are surrounded by only the W pixels, the accuracy in calculating a W value (luminance value) of the RGB pixel portion by using interpolation is improved. Since the luminance value of the RGB pixel portion can be interpolated with high accuracy, an image with high resolution can be obtained. Here, the RGB pixels being surrounded by the W pixels means that each of the W pixels is arranged adjacent to each of the R pixel, the G pixel, and the B pixel in the vertical direction, the horizontal direction, and the diagonal direction in a plan view.

Note that a CF arrangement applicable to the imaging element 100 of the present embodiment is not limited to the RGBW12 arrangement, and various CF arrangements can be applied. For example, an RGBW8 arrangement illustrated in FIG. 4B may be applied as a CF arrangement.

Also in the RGBW8 arrangement, in the same manner as the case of the RGBW12 arrangement, a block of contiguous four rows by four columns is the smallest repetition unit. In the 16 pixels 12 included in such a unit block, the ratio of the R pixel, the G pixel, the B pixel, and the W pixel is R:G:B:W=2:4:2:8. The W pixels are arranged in a checkered pattern, and each of the RGB pixels is arranged between W pixels. The ratio of the W pixels to all the pixels is 1/2. Since the W pixels are arranged in a checkered pattern in the same manner as the G pixels of the Bayer arrangement, the interpolation method of the G pixels of the Bayer arrangement can be used without modification. Further, the W pixel arrangement can improve the sensitivity.

Next, the operation of the imaging device according to the present embodiment will be described by using FIG. 1 to FIG. 10.

The photoelectric converter PD converts (photoelectrically converts) an incident light to an amount of charges corresponding to the amount of light and accumulates the generated charges (electrons). When the control signal PTX supplied to the gate becomes an H-level, the transfer transistor M1 turns to an on-state and transfers the charges generated in the photoelectric converter PD to the floating diffusion FD. When the control signal PRES supplied to the gate becomes an H-level, the reset transistor M2 turns to an on-state and resets the floating diffusion FD to a potential corresponding to the voltage VDD. By turning on the transfer transistor M1 and the reset transistor M2 at the same timing, the potential of the photoelectric converter PD is reset. When the control signal PSEL supplied to the gate becomes an HI-level, the select transistor M4 turns to an on-state, and the amplifier transistor M3 forms a source follower circuit. Thereby, a signal based on the potential of the floating diffusion FD is output to the output node PDOUT of the pixel 12.

The vertical scanning circuit 20 performs vertical scan, which is a readout operation on a row-by-row basis, on the pixels 12 in the imaging region 10 by controlling signal levels of the control signal PTX, the control signal PRES, and the control signal PSEL to be supplied to the pixel 12. When a vertical scan is performed by the vertical scanning circuit 20, a signal based on the reset voltage and a signal based on the charges transferred from the photoelectric converter PD to the floating diffusion FD are sequentially output from each pixel 12 to the output line 16 on a row-by-row basis.

When the signal PL becomes an H-level and the switch SW0 is turned on, an output signal from the pixel 12 is input to the inverting input terminal of the column amplifier 32 via the capacitor C0. With appropriate control of the switches SW1 and SW2 by the signals φC1 and φC, a signal that is input to the inverting input terminal of the column amplifier 32 is amplified at a gain represented by the capacitance ratio of C0/C1 and is output from the output terminal of the column amplifier 32.

When the switch SW3 is turned on in accordance with a timing when a signal based on the reset voltage is output from the pixel 12, the signal (N-signal) is sampled and held in the capacitor CTN. Further, when the switch SW4 is turned on in accordance with a timing when a signal based on a voltage at the time when the charges are transferred from the photoelectric converter PD to the floating diffusion FD is output, the signal (S-signal) is sampled and held in the capacitor CTS.

When an H-level signal φHn is output from the horizontal scanning circuit 40 sequentially on a column-by-column basis, the N-signal held in the capacitor CTN and the S-signal held in the capacitor CTS are sequentially transferred to an output amplifier 52. The output amplifier 52 amplifies and outputs the difference between the input S-signal and the input N-signal, and thereby a pixel signal from which a noise component at the time of reset has been removed is output.

As described above, a light signal input to the imaging element 100 can be read out as an electric signal.

Figure 5:
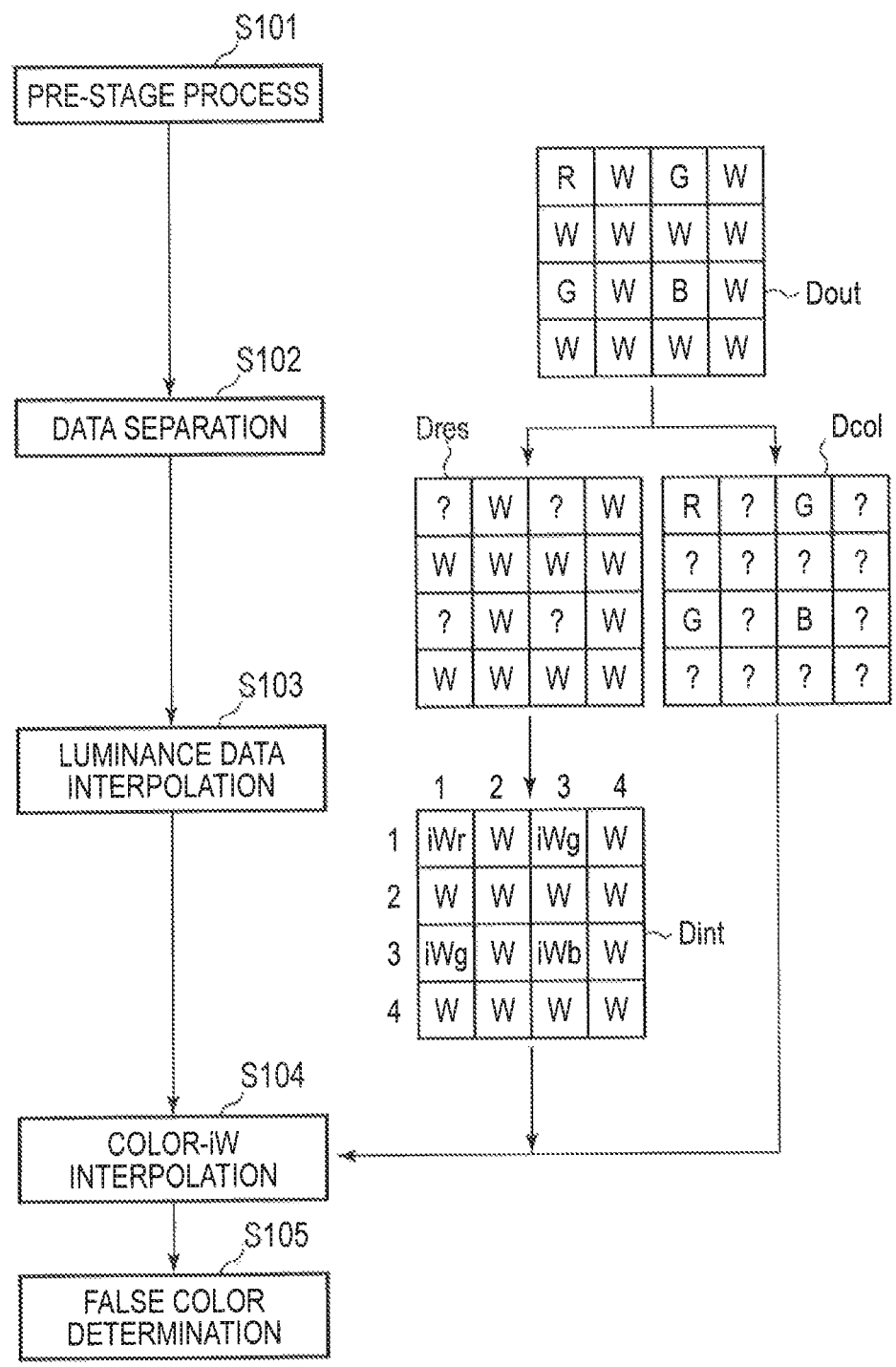
FIG. 5 is a flowchart illustrating a signal processing method in the imaging device according to the first embodiment of the present invention.

The pixel signal output from the imaging element 100 is processed in the signal processing unit 200 in accordance with a flow illustrated in FIG. 5. FIG. 5 is a flowchart illustrating a signal processing method in the imaging device according to the present embodiment.

The signal processing procedure illustrated in FIG. 5 includes step S101 of performing a pre-stage process, step S102 of performing a data separation process, step S103 of performing a luminance data interpolation process, step S104 of performing a color-iW interpolation process, and step S105 of performing a false color determination process. On the right side of the flowchart of FIG. 5, a process performed on the data of the pixel block of four rows by four columns which is the smallest repetition unit of the RGBW12 arrangement is schematically illustrated.

The pixel signal input from the imaging element 100 to the signal processing unit 200 is input to the pre-stage processing unit 210. The pre-stage processing unit 210 appropriately performs, on the pixel signal, a correction process (pre-stage process) such as offset (OFFSET) correction, gain (GAIN) correction, or the like of an input signal Din and creates a corrected output signal Dout. This process is typically expressed by the following Equation (1).

$$D\text{out}=(D\text{in}-\text{OFFSET})\cdot\text{GAIN} \tag{1}$$

This correction can be performed in various units. For example, correction may be performed on a pixel 12 basis, on a column amplifier 32 basis, on an analog-digital conversion (ADC) unit basis, on an output amplifier 52 basis, or the like. With the correction of the pixel signal, so-called fixed pattern noise can be reduced, and thereby a higher quality image can be obtained.

Next, the pre-stage processing unit 210 separates a W pixel signal for luminance information and an RGB pixel signal for color information from the output signal Dout. The separated luminance signal is then output to the luminance signal processing unit 220 to output the color signal to the color-iW interpolation unit 230 (step S102).

As illustrated as data Dres in FIG. 5, the separated luminance signal is in a state where, out of the 16 pixels of 4 rows by 4 columns, the pixel values (data on luminance information) of the 4 pixels 12 in which the color pixels are originally arranged are unknown (represented by "?" in the diagram). Further, as illustrated as data Dcol in FIG. 5, the separated color signal is in a state where, out of the 16 pixels of 4 rows by 4 columns, the pixel values (data on color information) of the 12 pixels 12 in which the white pixels are originally arranged are unknown (represented by "?" in the diagram).

Then, in the luminance signal processing unit 220, an interpolation process of the W value to each pixel portion of RGB is performed on the luminance signal input from the pre-stage processing unit 210 (step S103). As described above, the luminance signal received from the pre-stage processing unit 210 includes the data of the W pixel portion but does not include the data of the color pixel portion. Therefore, the luminance signal processing unit 220 performs an interpolation process of the W value on the portion of the pixel having unknown data and creates an interpolated luminance signal (data Dint).

Various methods can be employed as a method of interpolating pixel values. For example, a method such as a bilinear method or a bicubic method, a method of detecting the vertical, horizontal, and diagonal directionalities to calculate an average in the direction with a small rate of change, or the like can be appropriately selected. As an example here, a method of calculating the average of surrounding eight pixels will be described.

For illustration purposes of the interpolation method, the X coordinate (corresponding to a row number in the vertical direction) and the Y coordinate (corresponding to a column number in the horizontal direction) are added to the data Dint in FIG. 5. The pixel at coordinates (3, 3) is denoted as "iWb," for example. In FIG. 5, "iW" means the data of W calculated by interpolation, and "r", "g", and "b" appended to "iW" represent the corresponding relationship with the original color pixel. When interpolation data of a particular pixel is indicated in the present specification, the combination of these symbols and coordinates will be used. For example, the data of W at coordinates (3, 3) is represented as "iWb (3, 3)".

When a pixel value is interpolated by the average of the surrounding eight pixels, for example, the W value iWb (3, 3) of the pixel at the coordinates (3, 3) can be calculated from the following Equation (2).

$$iWb_{(3,3)} = \frac{W_{(2,2)} + W_{(1,2)} + W_{(4,2)} + W_{(2,3)} + W_{(4,3)} + W_{(2,4)} + W_{(1,4)} + W_{(4,4)}}{8} \quad (2)$$

In the same manner as the W value iWb (3, 3), the W values iWr (1, 1), iWg (3, 1), and iWg (1, 3) can also be interpolated by the W value of the surrounding pixels.

Since the RGBW12 arrangement includes a large number of W pixels for obtaining luminance information, information with a higher spatial frequency can be acquired compared to other CF arrangements such as the Bayer arrangement. It is therefore possible to interpolate W values to RGB pixels with high accuracy. The accuracy of the W interpolation not only improves the resolution of an image but also significantly influences the accuracy of the color calculation on the post-stage.

The luminance signal in which the W value of the color pixel portion is interpolated in such a way is input to the color-iW interpolation unit 230 together with the color signal.

Then, in the color-iW interpolation unit 230, a process of interpolating the R value, the G value, the B value, the iWr value, the iWg value, and the iWb value is performed on each pixel 12 (step S104). This process is referred to as "color-iW interpolation process" in the present specification.

Figures 6A, 6B, 7:
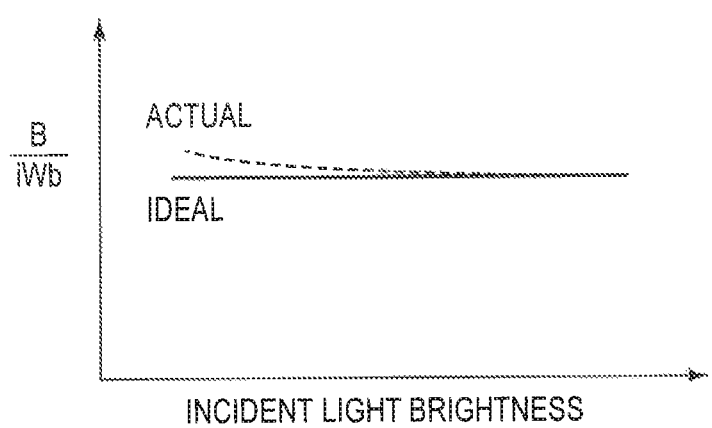
FIG. 6A and FIG. 6B are diagrams illustrating a color-iW interpolation method in the imaging device according to the first embodiment of the present invention.
FIG. 7 is a graph illustrating a relationship between a color/iW value and the luminance of an incident light.

The simplest method of color-iW interpolation is a method of defining a certain color calculation region and averaging and interpolating R, G, B, iWr, iWg, and iWb present within the region. For example, when a color calculation region of eight rows by eight columns as illustrated in FIG. 6A and FIG. 6B is defined and color-iW interpolation is performed on the W pixel at the coordinates (4, 4), each parameter can be calculated by the following Equations (3) to (8). Note that FIG. 6A is for the data Dout, and FIG. 6B is for the data Dint.

$$R_{(4,4)} = \frac{R_{(1,1)} + R_{(1,5)} + R_{(5,1)} + R_{(5,5)}}{4} \quad (3)$$

$$G_{(4,4)} = \frac{\begin{array}{c}G_{(1,3)} + G_{(1,7)} + G_{(3,1)} + \\ G_{(3,5)} + G_{(5,3)} + G_{(5,7)} + G_{(7,1)} + G_{(7,3)}\end{array}}{8} \quad (4)$$

$$B_{(4,4)} = \frac{B_{(1,1)} + B_{(3,7)} + B_{(7,3)} + B_{(7,7)}}{4} \quad (5)$$

$$iWr_{(4,4)} = \frac{iWr_{(1,1)} + iWr_{(1,5)} + iWr_{(5,1)} + iWr_{(5,5)}}{4} \quad (6)$$

$$iWg_{(4,4)} = \frac{\begin{array}{c}iWg_{(1,3)} + iWg_{(1,7)} + iWg_{(3,1)} + iWg_{(3,5)} + \\ iWg_{(5,3)} + iWg_{(5,7)} + iWg_{(7,1)} + iWg_{(7,5)}\end{array}}{8} \quad (7)$$

$$iWb_{(4,4)} = \frac{iWb_{(3,3)} + iWb_{(3,7)} + iWb_{(7,3)} + iWb_{(7,7)}}{4} \quad (8)$$

Although a method of simply averaging the elements in the color calculation region of eight rows by eight columns has been described in the example above, weighting in accordance with the distance from the pixel to be interpolated may be performed for averaging, or the range of the color calculation region may be further narrowed or widened.

The color-iW interpolation data generated in such a way is input to the false color determination unit 240.

Then, in the false color determination unit 240, the false color determination will be performed based on the iW interpolation data input from the color-iW interpolation unit 230 (step S105).

Before describing a specific process in the false color determination unit 240, false color will now be described. False color considered in the present embodiment occurs when the luminance of a light entering a particular color pixel within the color calculation region of the pixel value is low. When each pixel value of RGBW has linear characteristics for the luminance of an incident light, B/iWb is ideally a constant value regardless of the luminance as indicated by a solid line in the graph of FIG. 7, for example. In practice, however, the S/N ratio deteriorates as the luminance of an incident light decreases, and an error for the ideal value occurs as indicated by the broken line in the graph of FIG. 7. This is due to an offset component of the pixel 12, random noise, or the like. This cause an error in the color synthesizing operation for determining the final RGB value of each pixel, and thereby false color is generated. In particular, since the cycle of RGB pixels is coarse in the RGBW arrangement, false color such as color moiré is likely to occur. In order to reduce false color, it is necessary to determine the pixel where false color occurs and to detect the color information that causes the false color.

To determine whether or not false color occurs, it is necessary to obtain the luminance of a light that enters each color pixel. To this end, the W values (iWr, iWg, iWb) calculated by interpolation for each pixel 12 in the color-iW interpolation unit 230 can be used. The data of each pixel 12 includes the R value, the G value, the B value, and the W values interpolated for each color (iWr, iWg, iWb). When the W values of these values, that is, the values iWr, iWg, and iWb are compared, and when a significantly small value with respect to the other two values exists, an occurrence of false color can be determined.

Specifically, it is possible to determine whether or not false color is occurring in accordance with the procedure illustrated in FIG. 8, for example. FIG. 8 is an example of a flowchart illustrating a method of detecting the presence or absence of false color and color information causing the false color.

First, the difference between the intermediate value (med) and the minimum value (min) out of the three iW values of each pixel is calculated. This difference is then compared to a predetermined threshold value th1 by using the following Equation (9) (step S201).

$$\text{med}-\text{min}>\text{th1} \tag{9}$$

If the Equation is true, it is determined that "there is false color" ("yes" in step S201). If the Equation is false, it is determined that "there is no false color" ("no" in step S201). The optimum value of the threshold value th1 here changes depending on a gain or an offset level of a sensor. While it is preferable that the optimum value of the threshold value th1 be appropriately calculated from these pieces of information and used, the threshold value th1 may be set as a fixed value or may be set appropriately by a user.

When it is determined that "there is false color", the error color that causes false color is determined (step S202). The color information causing false color corresponds to a color having the worst S/N ratio, that is, a color having low luminance of an incident light. Therefore, the smallest value of iWr, iWg, or iWb is determined, and color information corresponding to the minimum value is output as error information.

Error information may be output in any form. FIG. 8 illustrates an example of defining and outputting "Error" as an output variable indicating error information. When red information is error (Min=iWr), 1 is output as a variable Error (step S203), for example. When green information is error (Min=iWg), 2 is output as a variable Error (step S204). When blue information is error (Min=iWb), 3 is output as a variable Error (step S205).

When it is determined that "there is no false color", 0 is output as a variable Error (step S206).

FIG. 9 is a picture image within a certain color calculation region when a vertical stripe pattern is captured. The regions of the third column, the fourth column, the seventh column, and the eighth column shaded with hatching in FIG. 9 indicate regions where the luminance of an incident light is low. As seen in the regions shaded with hatching in FIG. 9, false color occurs when the luminance of a light entering a particular color pixel within the calculation region is low. In the case of the pattern illustrated in FIG. 9, while half of all the R pixels and the G pixels are present in a region with high luminance, all the B pixels are present in a region with low luminance. In such a case, the S/N ratio of B/iWb is low, which causes false color.

Figure 10:
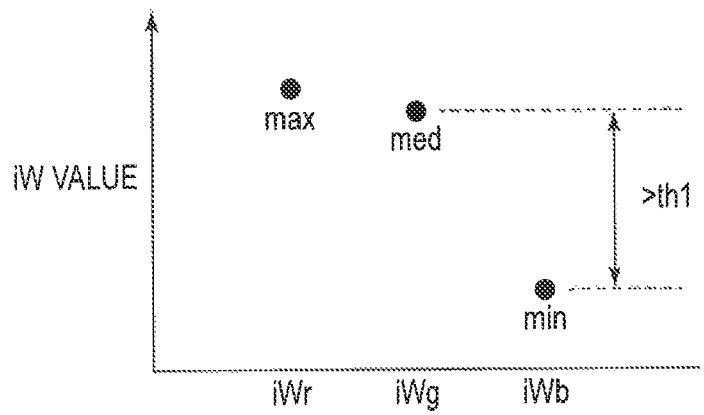
FIG. 10 is a diagram illustrating a relationship of iWr, iWg, and iWb when false color is determined.

FIG. 10 is a graph illustrating a relationship of the three iW values, iWr, iWg, and iWb of the W pixel at coordinates (4, 5) surrounded by the bold line in FIG. 9. When the difference between the intermediate value med (iWg in this case) and the minimum value min (iWb in this case) is larger than or equal to the threshold value th1, it is determined as "there is false color" in step S201. Since error color corresponds to color information having the lowest luminance and a low S/N ratio, the minimum value of the three iW values indicates error color. Since the minimum value in the example of FIG. 10 is iWb, blue color information is determined as an error in step S202. Then, 3 is output in step S205 as a variable Error indicating that blue color information is the error.

By determining the presence or absence of false color in such a way to perform error determination, it is possible to clearly identify a portion where a color shift occurs in an image and to reduce false recognition by a viewer.

As described above, according to the present embodiment, false color occurring in an image of the RGBW arrangement can be accurately determined.

[Second Embodiment]

An imaging device according to a second embodiment of the present invention will be described with reference to FIG. 11 to FIG. 13B. Components similar to those of the imaging devices according to the first embodiment are labeled with the same symbol, and the description thereof will be omitted or simplified.

In the first embodiment, a process of determining a color as false color when the luminance of the color is low out of color information of the three colors is performed. As a pattern when false color actually occurs, however, there are a pattern (single-color error) when the luminance of only one color is low and a pattern (two-color error) when the luminance of one color is high and the luminance of the other two colors is low. In the present embodiment, an imaging device will be described that can determine whether there is a single-color error or a two-color error and output color information which causes the error, in addition to perform determination on the presence or absence of false color.

The imaging device according to the present embodiment is the same as the imaging device according to the first embodiment except for the operation of the false color determination unit 240.

Figure 11:
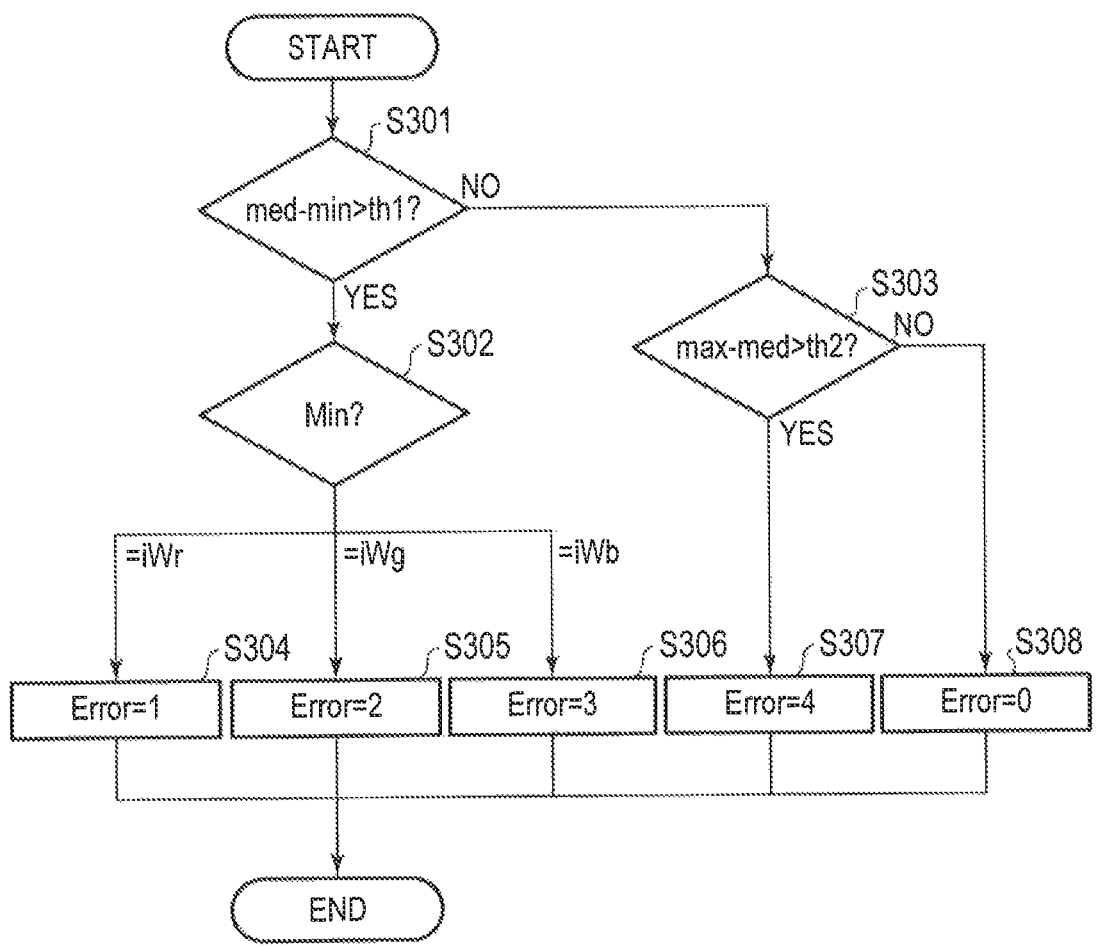
FIG. 11 is a flowchart illustrating a false color determination method in an imaging device according to a second embodiment of the present invention.

The false color determination unit 240 of the imaging device according to the present embodiment detects the presence or absence of an occurrence of false color and error color information in accordance with the procedure illustrated in FIG. 11, for example. FIG. 11 is an example of a flowchart illustrating a method for detecting the presence or absence of an occurrence of false color and color information which causes the false color.

First, the difference between the intermediate value (med) and the minimum value (min) out of the three iW values of each pixel is calculated. This difference is then compared to the predetermined threshold value th1 by using the following Equation (10) (step S301).

$$\text{med}-\text{min}>\text{th1} \tag{10}$$

If the Equation is true, it is determined that "there is false color" ("yes" in step S301). If the Equation is false, it is determined that "there is no single-color error" ("no" in step S301). The threshold value th1 is the same as in the case of the first embodiment.

When it is determined that "there is false color", determination of the error color that causes false color is performed in the same procedure as in the first embodiment (step S302), and error information is output. When red information is the error (Min=iWr), 1 is output as a variable Error (step S304), for example. When green information is the error (Min=iWg), 2 is output as a variable Error (step S305). When blue information is the error (Min=iWb), 3 is output as a variable Error (step S306).

When it is determined that "there is no single-color error", the process proceeds to a flow of determination of a two-color error (step S303). The presence or absence of the two-color error is determined by comparing the maximum value (max) to the intermediate value (med) out of the three iW values.

First, the difference between the maximum value (max) and the intermediate value (med) out of the three iW values is calculated. This difference is then compared to a predetermined threshold value th2 by using the following Equation (11) (step S303).

$$\text{max}-\text{med}>\text{th}2 \qquad (11)$$

If the Equation is true, it is determined that "there is a two-color error" ("yes" in step S303). If the Equation is false, it is determined that "there is no false color" ("no" in step S303). The optimum value of the threshold value th2 changes depending on a gain or an offset level of a sensor. While it is preferable that the optimum value be appropriately calculated from these pieces of information and used, the value may be set as a fixed value or may be set appropriately by a user.

When it is determined as "two-color error", 4 is output as a variable Error (step S307), for example. When it is determined that "there is no false color", 0 is output as a variable Error (step S308).

FIG. 12 is a picture image within a calculation region when a lattice pattern is captured. The regions of the third row, the fourth row, the seventh row, the eighth row, the third column, the fourth column, the seventh column, and the eighth column shaded with hatching in FIG. 12 indicate regions where the luminance of an incident light is low. As seen in the regions shaded with hatching in FIG. 12, false color occurs when the luminance of a light entering a particular color pixel within the calculation region is low. In the case of the pattern illustrated in FIG. 12, while all the R pixels are present in a region with high luminance, all the G pixels and the B pixels are present in a region with low luminance. In such a case, the S/N ratios of G/iWg and B/iWb are low, which causes false color.

Figure 13A:
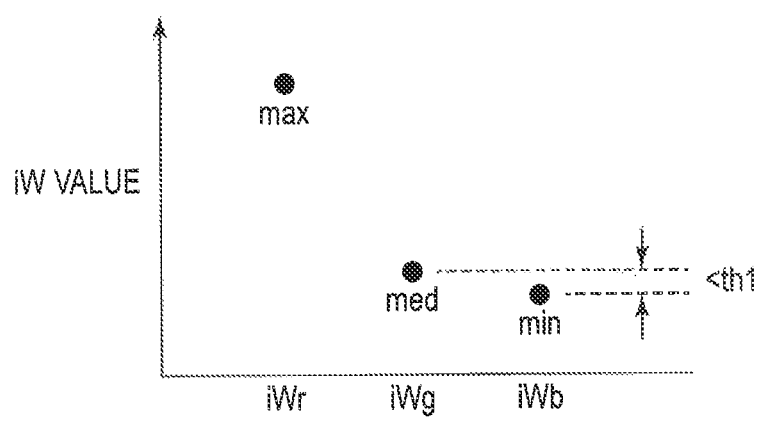
FIG. 13A and FIG. 13B are diagrams illustrating a relationship of iWr, iWg, and iWb when false color is determined.
Figure 13B:
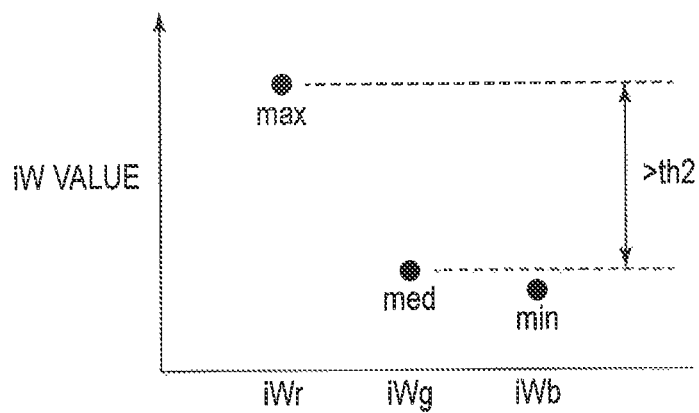

FIG. 13A and FIG. 13B are graphs illustrating relationships of the three iW values, iWr, iWg, and iWb of the W pixel at coordinates (6, 5) surrounded by the bold line in FIG. 12.

First, single-color error determination is performed. In this example, as illustrated in FIG. 13A, since the difference between the intermediate value med (iWg) and the minimum value min (iWb) is less than the threshold value th1, it is determined that "there is no single-color error" in step S301.

Next, two-color error determination is performed. The determination of a two-color error is performed by comparing the difference between the maximum value max and the intermediate value med out of the three iW values to the threshold value th2. In this example, as illustrated in FIG. 13B, since the difference between the maximum value max (iWr) and the intermediate value med (iWg) is larger than the threshold value th2, it is determined that "there is a two-color error". Then, 4 is output in step S307 as a variable Error indicating the two-color error.

By performing the two-color error determination in such a way, it is possible to clearly identify a portion where a significant color shift occurs in an image. For example, in an image processing system that performs object recognition based on color information in an image, it is possible to clearly identify unreliable pixels by using this false color occurrence location information, and thereby object recognition errors can be reduced.

As described above, according to the present embodiment, it is possible to accurately determine false color occurring in an image of the RGBW arrangement.

[Third Embodiment]

An imaging device according to a third embodiment of the present invention will be described with reference to FIG. 14 and FIG. 15. Components similar to those of the imaging device according to the first and the second embodiments are labeled with the same symbol, and the description thereof will be omitted or simplified.

In the present embodiment, an imaging device having a function of performing false color correction by using an output result from the false color determination unit 240 will be described.

Figure 14:
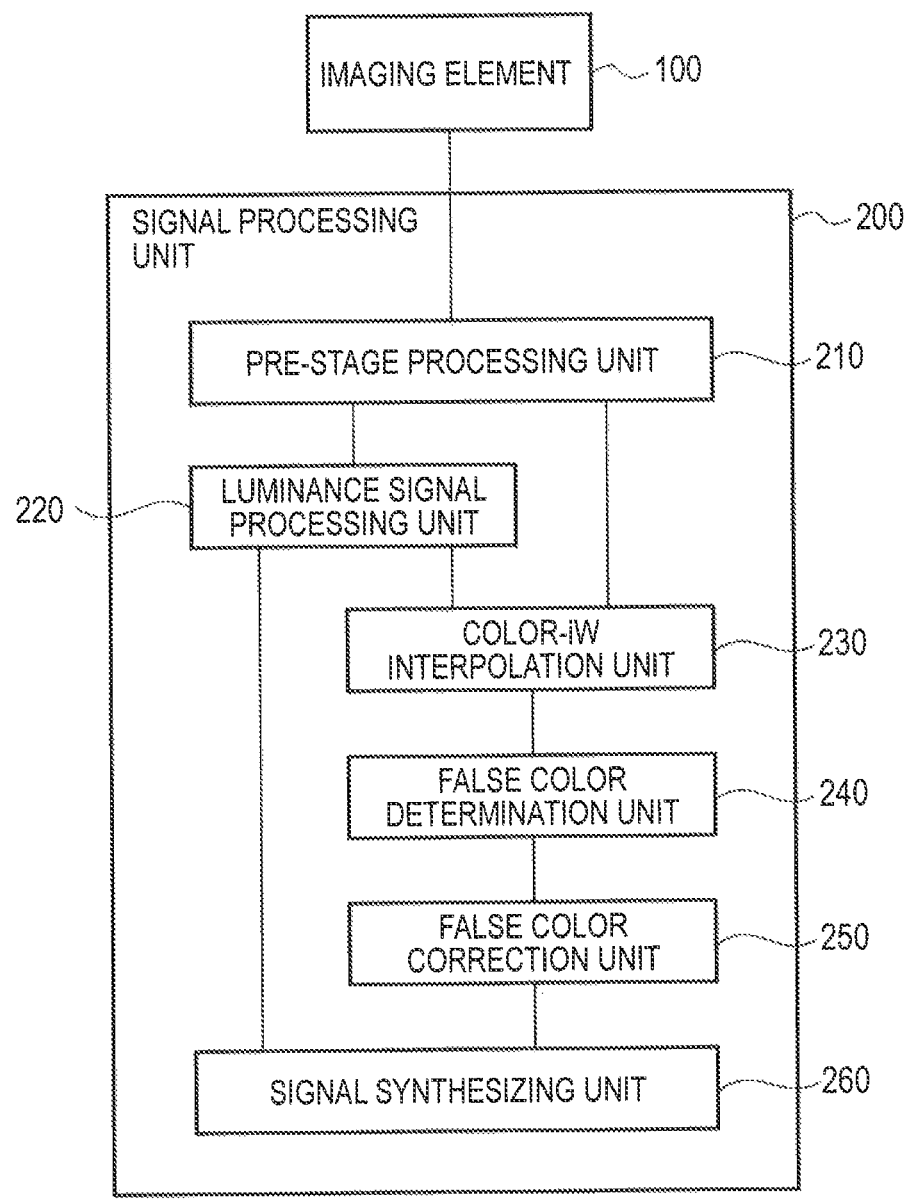
FIG. 14 is a block diagram illustrating a configuration example of an imaging device according to a third embodiment of the present invention.

FIG. 14 is a block diagram illustrating a general configuration of an imaging device according to the present embodiment. The imaging device according to the present embodiment includes a signal processing unit 200 that further includes a false color correction unit 250 and a signal synthesizing unit 260, as illustrated in FIG. 14, in addition to the configuration of the imaging device according to the first and the second embodiment. The false color correction unit 250 receives error color information from the false color determination unit 240, corrects the color information correctly, and outputs three pieces of color information (R/iWr, G/iWg, B/iWb). The signal synthesizing unit 260 synthesizes an output of the luminance signal processing unit 220 and an output of the false color correction unit 250 and calculates the RGB value of each pixel.

The process in each block will be described below. Although the present embodiment describes a case where the false color determination unit 240 performs the process described in the first embodiment as an example, it is also applicable to a case where the false color determination unit 240 performs the process described in the second embodiment.

Figure 15:
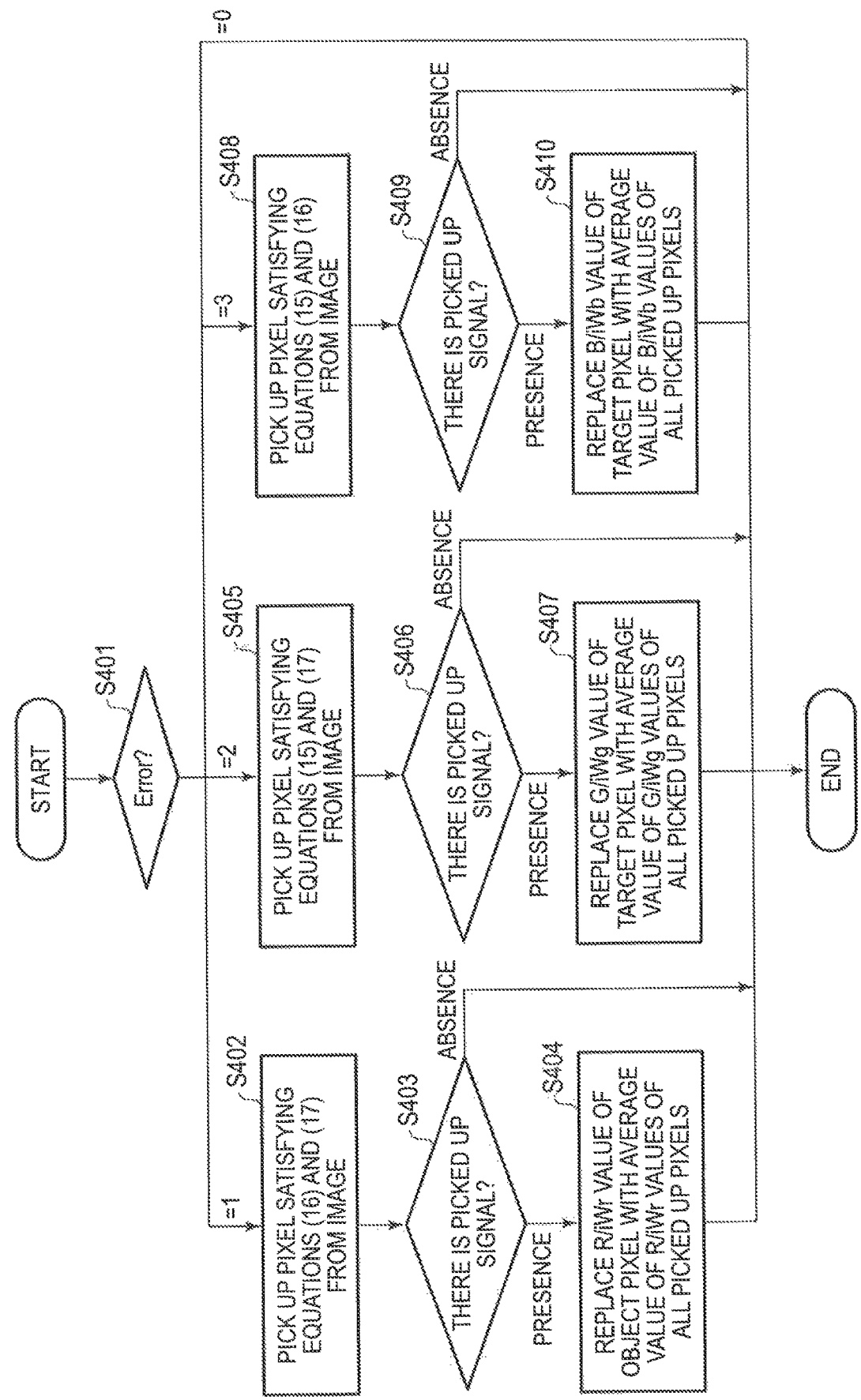
FIG. 15 is a flowchart illustrating a false color determination method in the imaging device according to the third embodiment of the present invention.

FIG. 15 is a flowchart illustrating a false color correction method in an imaging device according to the present embodiment. The false color correction unit 250 corrects color information determined as false color to the correct color information in accordance with a procedure illustrated in FIG. 15, for example.

First, the false color correction unit 250 determines an output value of error information (variable Error) output from the false color determination unit 240 (step S401).

When the variable Error received from the false color determination unit 240 is 0, since it is determined that "there is no false color", the process in the false color correction unit 250 ends without correcting color information, and the process proceeds to the process in the signal synthesizing unit 260.

When the variable Error received from the false color determination unit 240 is 1, 2, or 3, since it is determined that "there is false color", a correction process is performed on color information determined as false color. Here, a case where the variable Error is 3, that is, color information on B is the error will be described as an example.

When the variable Error is 3, that is, the error is a single-color error of B, the values of color information on R and color information on G are correct. Therefore, an image to be processed is searched for a pixel having a value close to the values of R/iWr and G/iWg of the data of the pixel to be corrected, and the pixel is picked up (step S408). Specifically, a pixel whose difference from information on the pixel to be corrected is less than or equal to a plus or minus threshold value is picked up by using following Equation (12) and Equation (13).

$$\frac{R}{iWr} - thr < \frac{R'}{iWr'} < \frac{R}{iWr} + thr \qquad (12)$$

$$\frac{G}{iWg} - thg < \frac{G'}{iWg'} < \frac{G}{iWg} + thg \qquad (13)$$

$$\frac{B}{iWb} - thb < \frac{B'}{iWb'} < \frac{B}{iWb} + thb \qquad (14)$$

Here, the values R'/iWr', G'/iWg', and B'/iWb' each are color/iW information of the pixel to be searched for. The values thr, thg, and thb are threshold values appropriately set by a user.

Next, it is confirmed whether or not the pixel can be picked up by the search in step S408 (step S409). When at least one pixel satisfying the condition is picked up at step S409, the process proceeds to step S410.

Next, the values B/iWb of the picked-up pixels are averaged in step S410. Correction is then performed to replace B/iWb of the pixel to be corrected with the averaged B/iWb information. After error color information is corrected, color information on the three colors (R/iWr, G/iWg, and B/iWb) is output to the signal synthesizing unit 260.

When R color information is the error, Equation (13) and Equation (14) are used to perform steps S402, S403, and S404 to correct R color information in the same manner as the case where B color information is the error. Further, when G color information is the error, Equation (12) and Equation (14) are used to perform steps S405, S406, and S407 to correct G color information in the same manner as the case where B color information is the error.

The signal synthesizing unit 260 synthesizes a signal output from the luminance signal processing unit 220 and a signal output from the false color correction unit 250 and performs a process of calculating an RGB value of each pixel. In this block, data of a color image is output by multiplying a monochrome luminance signal output from the luminance signal processing unit 220 by color information output from the false color correction unit 250.

A demosaicing process of the signal synthesizing unit 260 is calculated based on the ratio of pixel values of the RGB pixels and the W pixels. The RGB values at coordinates (4, 4) can be calculated from the following Equations (15), (16), and (17), for example. The same applies to pixels in other locations.

$$R\_ratio(4, 4) = \frac{\frac{R}{iWr}}{\frac{R}{iWr} + \frac{G}{iWg} + \frac{B}{iWb}} \times W(4, 4) \qquad (15)$$

$$G\_ratio(4, 4) = \frac{\frac{G}{iWg}}{\frac{R}{iWr} + \frac{G}{iWg} + \frac{B}{iWb}} \times W(4, 4) \qquad (16)$$

$$B\_ratio(4, 4) = \frac{\frac{B}{iWb}}{\frac{R}{iWr} + \frac{G}{iWg} + \frac{B}{iWb}} \times W(4, 4) \qquad (17)$$

Here, R is the average value of pixel values of the R pixels within the color calculation region, G is the average value of pixel values of the G pixels within the color calculation region, and B is the average value of pixel values of the B pixels within the color calculation region.

Not only Equations (15), (16), and (17) but also other calculation equations may be used for calculation of the RGB values. The RGB values can be also calculated by simply multiplying the color/iW ratio by the luminance signal, for example. Such calculation formulas are expressed as, for example, the following Equations (18), (19), and (20).

$$R\_ratio = \frac{R}{iWr} \times W \qquad (18)$$

$$G\_ratio = \frac{G}{iWg} \times W \qquad (19)$$

$$B\_ratio = \frac{B}{iWb} \times W \qquad (20)$$

By performing a false color correction process as described above, it is possible to obtain a preferable image with high color-reproducibility.

As described above, according to the present embodiment, it is possible to accurately determine and correct false color that occurs in an image of the RGBW arrangement.

[Fourth Embodiment]

An imaging device according to a fourth embodiment of the present invention will be described with reference to FIG. 16. Components similar to those of the imaging device according to the first to the third embodiments are labeled with the same symbol, and the description thereof will be omitted or simplified.

In the third embodiment, a method of false color correction by correcting error color based on color information on other pixels has been described. However, this method takes times for the searching process, and requires a large load of calculation in the processing system. Therefore, in the present embodiment, as a method of performing false color correction in a simple manner, a method of calculating a corrected value of error color by using two colors other than the error color and the value of W will be described.

Figure 16:
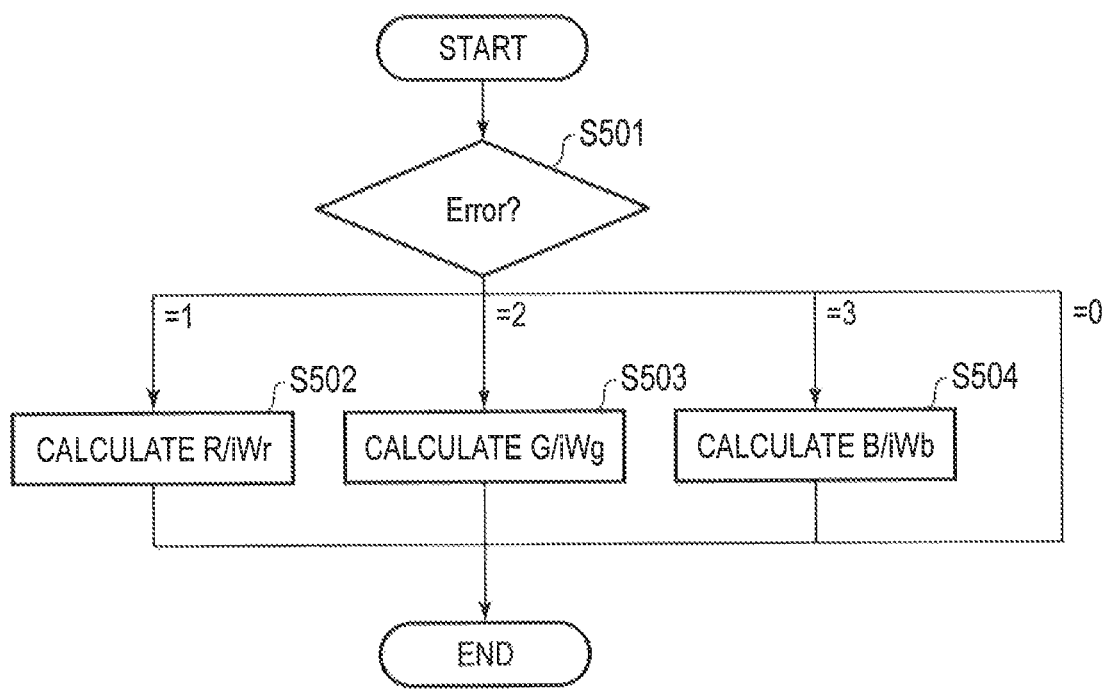
FIG. 16 is a flowchart illustrating a false color determination method in an imaging device according to a fourth embodiment of the present invention.

FIG. 16 is a flowchart illustrating a false color correction method in an imaging device according to the present embodiment. In the present embodiment, the false color correction unit 250 corrects color information determined as false color to the correct color information in accordance with a procedure illustrated in FIG. 16, for example.

First, the false color correction unit 250 determines an output value of error information (variable Error) output from the false color determination unit 240 (step S501).

When the variable Error received from the false color determination unit 240 is 0, since it is determined that "there is no false color", the process in the false color correction unit 250 ends without correcting color information, and the process proceeds to the process in the signal synthesizing unit 260.

When the variable Error received from the false color determination unit 240 is 1, 2, or 3, since it is determined that "there is false color", a correction process is performed on color information determined as false color.

In the present embodiment, it is assumed that values of R, G, B, and W have a relationship expressed in Equation (21) below.

$$W = a(R+G+B) \tag{21}$$

This equation is based on an assumption that a value of each color of R, G, B, and W has linearity to the luminance. The value "a" is a coefficient for matching R+G+B with W and is calculated from the characteristics of image sensors.

Equation (21) is transformed into the following Equation (22).

$$1 = a \cdot \left(\frac{R}{W} + \frac{G}{W} + \frac{B}{W}\right) \tag{22}$$

When it is here assumed that R/W, G/W and B/W are constant regardless of the luminance, the following Equation (23) is established.

$$1 = a \cdot \left(\frac{R}{iWr} + \frac{G}{iWg} + \frac{B}{iWb}\right) \tag{23}$$

When color information on B is an error, for example, Equation (23) is transformed such that color information on B is corrected in accordance with the following Equation (24). The same applies to a case where color information on R or color information on G is the error.

$$\frac{B}{iWb} = \frac{1}{a} - \left(\frac{R}{iWr} + \frac{G}{iWg}\right) \tag{24}$$

By performing a false color correction process of the present embodiment, it is possible to obtain a preferable image with high color-reproducibility and reduce the size of a circuit used for the false color correction process.

As described above, according to the present embodiment, it is possible to accurately determine and correct false color that occurs in an image of the RGBW arrangement.

[Fifth Embodiment]

Figure 17:
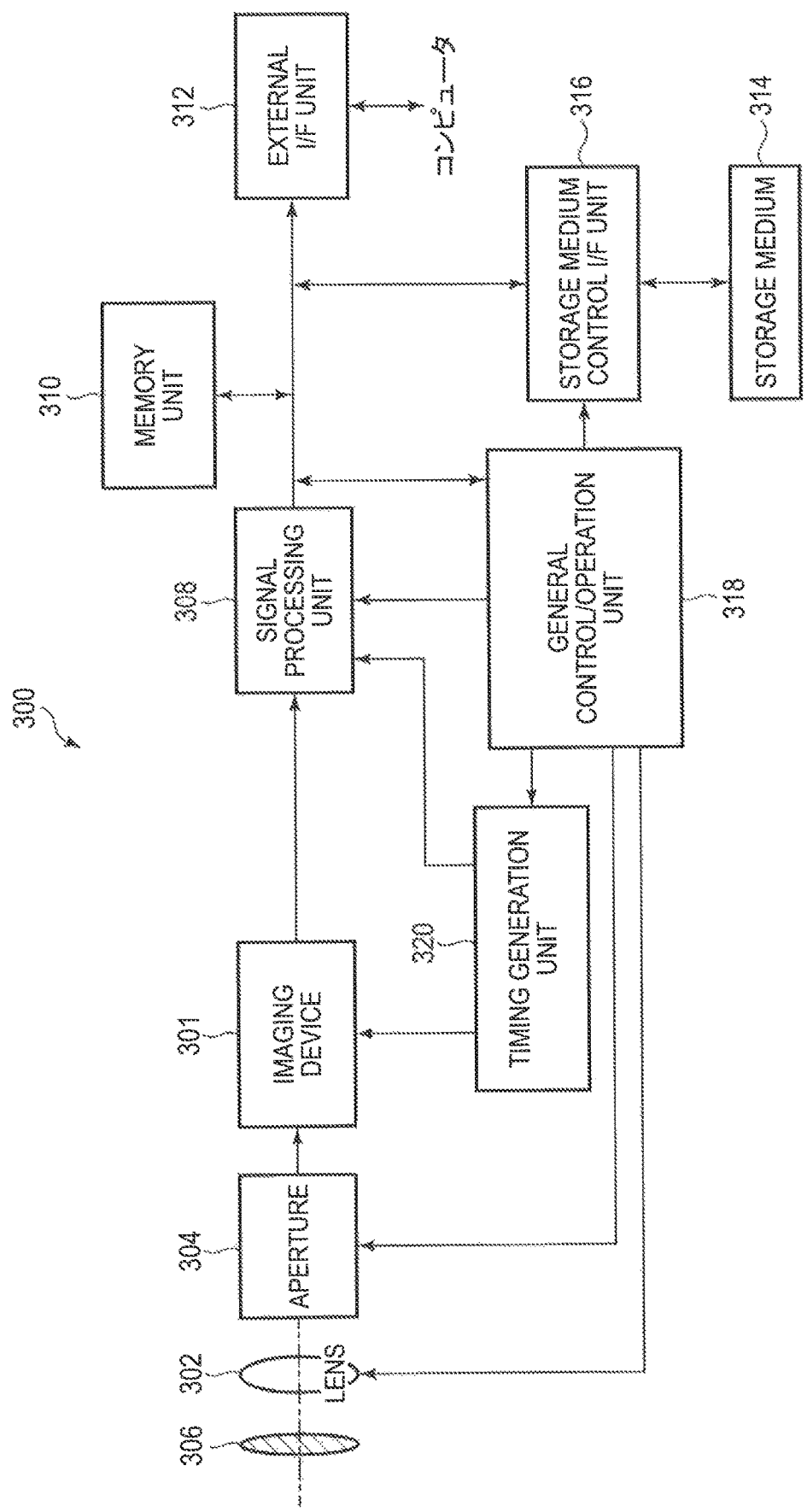
FIG. 17 is a block diagram illustrating a general configuration of an imaging system according to a fifth embodiment of the present invention.

An imaging system according to a fifth embodiment of the present invention will be described by using FIG. 17. FIG. 17 is a block diagram illustrating a general configuration of an imaging system according to the present embodiment.

An imaging system 300 of the present embodiment includes an imaging device to which the configuration described in any of the first to fourth embodiments is applied. Specific examples of the imaging system 300 may include a digital still camera, a digital camcorder, a surveillance camera, and the like. FIG. 17 illustrates a configuration example of a digital still camera to which an imaging device of any of the above embodiments is applied.

The imaging system 300 illustrated as an example in FIG. 17 includes the imaging device 301, a lens 302 that captures an optical image of an object onto the imaging device 301, an aperture 304 for changing a light amount passing through the lens 302, and a barrier 306 for protecting the lens 302. The lens 302 and the aperture 304 form an optical system that converges a light onto the imaging device 301.

The imaging system 300 further includes a signal processing unit 308 that processes an output signal output from the imaging device 301. The signal processing unit 308 performs an operation of signal processing for performing various correction and compression on an input signal, if necessary, to output the signal. For example, the signal processing unit 308 performs on an input signal, predetermined image processing such as a conversion process of converting pixel output signals of RGB to Y, Cb, Cr color space, gamma correction, or the like. Further, the signal processing unit 308 may have some or all of the functions of the signal processing unit 200 in the imaging device described in the first to fourth embodiments.

The imaging system 300 further includes a memory unit 310 for temporarily storing image data therein and an external interface unit (external I/F unit) 312 for communicating with an external computer or the like. The imaging system 300 further includes a storage medium 314 such as a semiconductor memory used for performing storage or readout of imaging data and a storage medium control interface unit (storage medium control I/F unit) 316 used for performing storage or readout on the storage medium 314. Note that the storage medium 314 may be embedded in the imaging system 300 or may be removable.

The imaging system 300 further includes a general control/operation unit 318 that performs various computation and controls the entire digital still camera and a timing generation unit 320 that outputs various timing signals to the imaging device 301 and the signal processing unit 308. The timing signal or the like may be externally input, and the imaging system 300 may include at least the imaging device 301 and the signal processing unit 308 that processes an output signal output from the imaging device 301. The general control/operation unit 318 and the timing generation unit 320 may be configured to perform some or all of control functions of the imaging device 301.

The imaging device 301 outputs an image signal to the signal processing unit 308. The signal processing unit 308 performs predetermined signal processing on an image output from the imaging device 301 and outputs an image signal. Further, the signal processing unit 308 generates an image by using the image signals. The image generated in the signal processing unit 308 is stored in the storage medium 314, for example. Further, the image generated in the signal processing unit 308 is displayed as a moving image or a static image on a monitor formed of a liquid crystal display or the like. An image stored in the storage medium 314 can be hard-copied by a printer or the like.

By forming an imaging system using the imaging device of each embodiment described above, it is possible to realize an imaging system capable of acquiring a higher quality image.

[Sixth Embodiment]

Figure 18A:
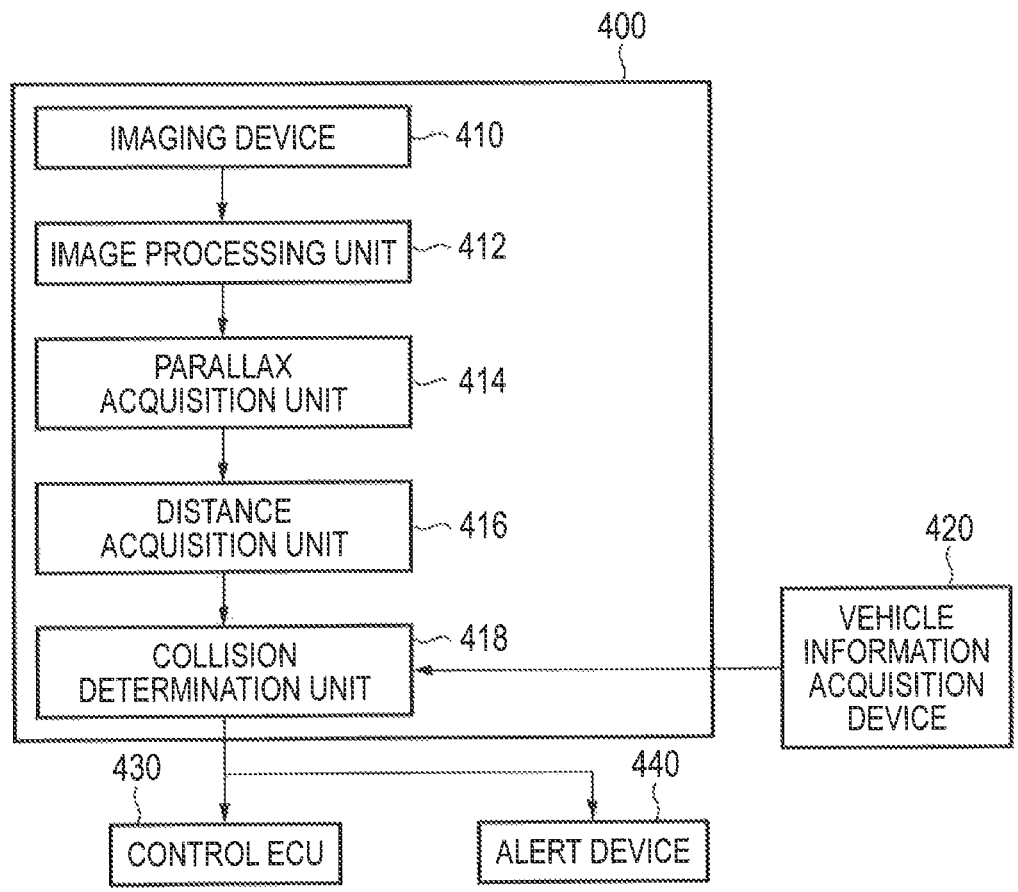
FIG. 18A is a diagram illustrating a configuration example of an imaging system according to a sixth embodiment of the present invention.
Figure 18B:
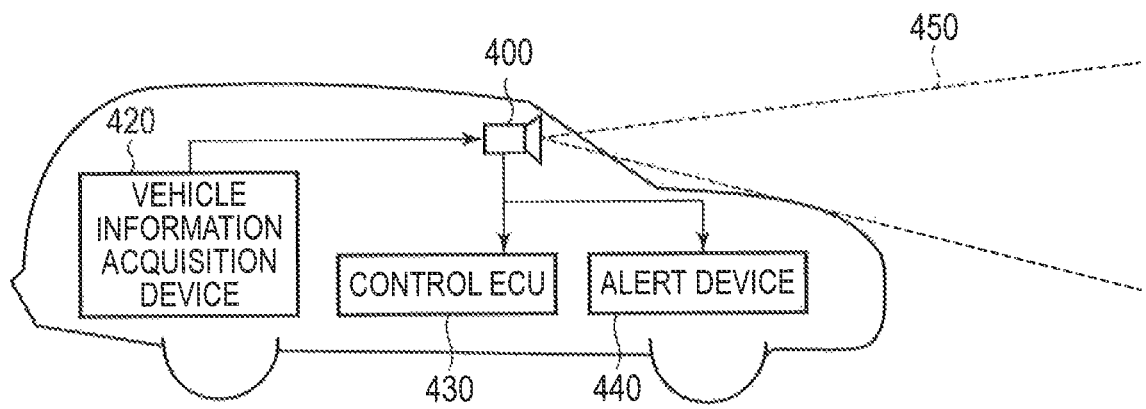
FIG. 18B is a diagram illustrating a configuration example of a movable object according to the sixth embodiment of the present invention.

An imaging system and a movable object according to a sixth embodiment of the present invention will be described by using FIG. 18A and FIG. 18B. FIG. 18A is a diagram illustrating a configuration of an imaging system according to the present embodiment. FIG. 18B is a diagram illustrating a configuration of a movable object according to the present embodiment.

FIG. 18A illustrates an example of an imaging system 400 related to an on-vehicle camera. The imaging system 400 includes an imaging device 410. The imaging device 410 is any of the imaging devices described in each of the above embodiments. The imaging system 400 includes an image processing unit 412 that performs image processing on a plurality of image data acquired by the imaging device 410 and a parallax acquisition unit 414 that calculates a parallax (a phase difference of parallax images) from the plurality of image data acquired by the imaging device 410. The image processing unit 412 may have some or all of the functions of the signal processing unit 200 in the imaging device described in the first to the fourth embodiment. Further, the imaging system 400 includes a distance acquisition unit 416 that calculates a distance to an object based on the calculated parallax and a collision determination unit 418 that determines whether or not there is a collision possibility based on the calculated distance. Here, the parallax acquisition unit 414 and the distance acquisition unit 416 are an example of a distance information acquisition unit that acquires distance information on the distance to an object. That is, the distance information is information on a parallax, a defocus amount, a distance to an object, or the like. The collision determination unit 418 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by a combination thereof.

The imaging system 400 is connected to a vehicle information acquisition device 420 and can acquire vehicle information such as a vehicle speed, a yaw rate, a steering angle, or the like. Further, the imaging system 400 is connected to a control ECU 430, which is a control device that outputs a control signal for causing a vehicle to generate braking force based on a determination result by the collision determination unit 418. That is, the control ECU 430 is an example of a movable object control unit for controlling a movable object based on the distance information. Further, the imaging system 400 is also connected to an alert device 440 that issues an alert to the driver based on a determination result by the collision determination unit 418. For example, when the collision probability is high as the determination result of the collision determination unit 418, the control ECU 430 performs vehicle control to avoid a collision or reduce damage by applying a brake, pushing back an accelerator, suppressing engine power, or the like. The alert device 440 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 400. FIG. 18B illustrates the imaging system 400 in a case of capturing a front area of a vehicle (a capturing region 450). The vehicle information acquisition device 420 transmits instructions to cause the imaging system 400 to operate and perform capturing. The use of the imaging device of each embodiment described above as the imaging device 410 enables the imaging system 400 of the present embodiment to further improve the ranging accuracy.

Although an example of control for avoiding a collision to another vehicle has been described in the description above, it is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

[Modified Embodiments]

The present invention is not limited to the embodiments described above, and various modification are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, the circuit configuration of the pixel 12 or the column readout circuit 30 is not limited to that illustrated in FIG. 3 and can be changed if necessary. For example, each of the pixels 12 may include a plurality of photoelectric converters PD.

Further, although a case where the RGBW arrangement is employed as a color filter arrangement has been described in the above embodiments, it is not necessarily required to be the color filter of the RGBW arrangement. It may be a color filter of a CMYW arrangement including a C pixel having a cyan CF, an M pixel having a magenta CF, a Y pixel having a yellow CF, and the W pixels, for example.

Further, the imaging systems illustrated in the fifth and sixth embodiments are examples of an imaging system to which the imaging device of the present invention may be applied, the imaging system to which the imaging device of the present invention can be applied is not limited to the configuration illustrated in FIG. 17 and FIGS. 18A and 18B.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-218283, filed Nov. 13, 2017, which is hereby incorporated by reference herein in its entirety.

What is claimed is:

1. An imaging device comprising:
   an imaging element that includes a plurality of pixels including a plurality of first pixels each of which outputs a signal including color information and a plurality of second pixels each of which has higher sensitivity than the first pixels; and
   a signal processing unit that processes a signal output from the imaging element,
   wherein the signal processing unit includes
      a luminance signal processing unit that generates luminance values of the first pixels based on signals output from the second pixels, and
      a false color determination unit that determines a presence or absence of false color based on a result of comparison between the luminance values of the first pixels generated by the luminance signal processing unit and a predetermined threshold value.

2. The imaging device according to claim 1, wherein the luminance signal processing unit generates the luminance values of the first pixels by performing an interpolation process by using signals output from the plurality of the second pixels.

3. The imaging device according to claim 1,
   wherein the plurality of first pixels include plural types of the first pixels that output color information on different colors, and
   wherein the signal processing unit further includes a color-iW interpolation unit that performs an interpolation process by using plural types of color information output from the plural types of the first pixels and luminance information on the plurality of first pixels generated by the luminance signal processing unit to generate plural color information and plural luminance information that correspond to the plural types of colors for each of the plurality of pixels.

4. The imaging device according to claim 3,
   wherein the plural luminance information corresponding to the plural types of colors include a maximum value, an intermediate value, and a minimum value, and
   wherein the false color determination unit outputs information indicating that there is an occurrence of false color when a difference between the intermediate value and the minimum value is larger than the threshold value.

5. The imaging device according to claim 4, wherein the false color determination unit outputs information indicating that a color corresponding to the minimum value causes false color when a difference between the intermediate value and the minimum value is larger than the threshold value.

6. The imaging device according to claim 3,
   wherein the plural luminance information corresponding to the plural types of colors include a maximum value, an intermediate value, and a minimum value, and
   wherein the false color determination unit outputs information indicating that there is an occurrence of false color when a difference between the intermediate value and the minimum value is smaller than a first threshold value and a difference between the maximum value and the intermediate value is larger than a second threshold value.

7. The imaging device according to claim 6, wherein the false color determination unit outputs information indicating that colors corresponding to the minimum value and the intermediate value cause false color when a difference between the intermediate value and the minimum value is smaller than the first threshold value and a difference between the maximum value and the intermediate value is larger than the second threshold value.

8. The imaging device according to claim 3, wherein the signal processing unit further includes a false color correction unit that corrects information output by the color-iW interpolation unit when there is an occurrence of false color.

9. The imaging device according to claim 8, wherein the false color correction unit searches for a pixel which has a value close to color information on colors other than a color causing false color out of the plural color information of a pixel in which false color occurs and, based on color information on the searched pixel, corrects color information on the color causing false color of the pixel in which false color occurs.

10. The imaging device according to claim 8, wherein based on color information on a color other than a color causing false color out of the plural color information of a pixel in which false color occurs, the false color correction unit corrects color information on the color causing false color of the pixel in which false color occurs.

11. The imaging device according to claim 8, wherein the signal processing unit further includes a signal synthesizing unit that synthesizes an output of the luminance signal processing unit and an output of the false color correction unit to calculate an RGB value of the plurality of pixels.

12. The imaging device according to claim 1, wherein each of the plurality of the first pixels is surrounded by the second pixels.

13. The imaging device according to claim 1, wherein the plurality of pixels include the second pixels such that the number of the second pixels is twice or more than the number of the first pixels.

14. The imaging device according to claim 1, wherein the plurality of the first pixels includes R pixels, G pixels, and B pixels.

15. The imaging device according to claim 1, wherein the plurality of the first pixels includes C pixels, M pixels, Y pixels.

16. The imaging device according to claim 1, wherein the plurality of the second pixels are W pixels.

17. A signal processing device that processes a signal output from an imaging element that includes a plurality of pixels including a plurality of first pixels each of which outputs a signal including color information and a plurality of second pixels each of which has higher sensitivity than the first pixels, the signal processing device comprising:
   a luminance signal processing unit that generates luminance values of the first pixels based on luminance information output from the second pixels; and
   a false color determination unit that determines false color by comparing the luminance values of the first pixels generated by the luminance signal processing unit to a predetermined threshold value.

18. An imaging system comprising:
   an imaging device including an imaging element that includes a plurality of pixels including a plurality of first pixels each of which outputs a signal including color information and a plurality of second pixels each of which has higher sensitivity than the first pixels; and
   a signal processing unit that processes a signal output from the imaging device, wherein the signal processing unit includes
- a luminance signal processing unit that generates luminance values of the first pixels based on luminance information output from the second pixels, and
- a false color determination unit that determines false color by comparing the luminance values of the first pixels generated by the luminance signal processing unit to a predetermined threshold value.

19. A movable object comprising:

the imaging device according to claim 1;

a distance information acquisition unit that acquires distance information on a distance to an object, from a parallax image based on signals output from the pixels of the imaging device; and a control unit that controls the movable object based on the distance information.

* * * * *